(12) United States Patent
Fontenot

(10) Patent No.: US 6,463,477 B1
(45) Date of Patent: Oct. 8, 2002

(54) DETECTION OF PRESENCE OF MULTIPROTOCOL ENCAPSULATION IN A DATA PACKET

(75) Inventor: Michael Douglas Fontenot, Plano, TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/722,512

(22) Filed: Sep. 27, 1996

(51) Int. Cl.[7] .............................................. G06F 15/16
(52) U.S. Cl. ........................ 709/236; 709/230; 709/224
(58) Field of Search ....................... 395/200.6; 370/264, 370/474, 401, 409, 402, 466, 461, 463, 392, 393, 398, 399, 395; 709/230, 250, 224, 227, 228, 236

(56) References Cited

U.S. PATENT DOCUMENTS

| | | | |
|---|---|---|---|
| 4,787,028 A | * 11/1988 | Finfrock et al. | 710/105 |
| 5,200,952 A | 4/1993 | Bernstein et al. | 370/79 |
| 5,251,205 A | 10/1993 | Callon et al. | 370/60 |
| 5,432,777 A | * 7/1995 | Boudec et al. | 370/397 |
| 5,483,526 A | 1/1996 | Ben-Nun et al. | 370/60.1 |
| 5,490,140 A | * 2/1996 | Abensour et al. | 370/397 |
| 5,490,141 A | * 2/1996 | Lai et al. | 370/352 |
| 5,511,076 A | 4/1996 | Ramakrishnan et al. | 370/94.2 |
| 5,537,417 A | * 7/1996 | Sharma et al. | 709/228 |
| 5,539,734 A | * 7/1996 | Burwell et al. | 370/410 |
| 5,539,884 A | * 7/1996 | Robrock, II | 709/227 |
| 5,568,471 A | * 10/1996 | Hershey et al. | 370/245 |
| 5,568,477 A | * 10/1996 | Galand et al. | 370/229 |
| 5,627,836 A | * 5/1997 | Conoscenti et al. | 370/397 |
| 5,710,756 A | * 1/1998 | Pasternak et al. | 370/216 |
| 5,768,271 A | * 6/1998 | Seid et al. | 370/389 |
| 5,850,388 A | * 12/1998 | Anderson et al. | 370/252 |
| 5,875,178 A | * 2/1999 | Rahuel et al. | 370/313 |
| 5,884,064 A | * 3/1999 | Rosenberg | 703/27 |

(List continued on next page.)

OTHER PUBLICATIONS

O'Leary, D., ed.,"Frame Relay/ATM PVC Service Interworking Implementation Agreement," The Frame Relay Forum, Document Number FRF.8, Apr. 14, 1995, pp. 1–25.
Bradley et al., "Multiprotocol Interconnect Over Frame Relay," Internet Engineering Task Force Document IETF RFC 1490, Jul. 1993, pp. 1–25.
Cherukuri, Rao, ed., "Multiprotocol Encapsulation Implementaion Agreement," Frame Relay Forum, Document FRF.3, Jul. 1993, pp. 1–25.
Heinanene, Juha, "Multiprotocol Encapsulation Over ATM Adaption Layer 5," Internet Engineering Task Force Document IETF RFC 1483, Jul. 1993, pp. 1–16.
Cherukuri, Rao, ed., "Multiprotocol Encapsulation Implementation Agreement," Frame Relay Forum, Document FRF.3.1, Jun. 22, 1995, pp. 1–12.
McDysan, D. et al., *ATM: Theory and Application*, McGraw–Hill, Inc.: USA, (1995) (entire book provided).

*Primary Examiner*—Zarni Maung
*Assistant Examiner*—Jason D. Cardone

(57) ABSTRACT

A method, system and computer program product is provided which automatically detects multiprotocol encapsulation in a protocol data unit (PDU) to determine whether a Frame Relay/ATM service interworking function should operate in translation or transparent mode. A multiprotocol encapsulation detection module first reads a control field value in a received PDU. The control field value is then compared to a predetermined value representative of the presence of multiprotocol encapsulation in the PDU. An indication of the detected presence of multiprotocol encapsulation in the PDU is then provided when the control field value equals the predetermined value. An FR/ATM service interworking function module is then operated in translation mode when multiprotocol encapsulation has been detected and indicated. Otherwise, the FR/ATM service interworking function module is operated in transparent mode when multiprotocol encapsulation has not been detected.

23 Claims, 6 Drawing Sheets

U.S. PATENT DOCUMENTS

| | | | |
|---|---|---|---|
| 5,898,673 A | * | 4/1999 | Riggan et al. ............... 370/237 |
| 5,917,823 A | * | 6/1999 | Benning et al. ............ 370/397 |
| 5,936,965 A | * | 8/1999 | Doshi ......................... 370/469 |
| 6,137,798 A | * | 1/2000 | Nishihara et al. ........... 370/392 |
| 6,081,524 A | * | 6/2000 | Chase et al. ................. 370/389 |
| 6,222,844 B1 | * | 4/2001 | Han et al. .................... 370/397 |
| 6,226,260 B1 | * | 5/2001 | McDysan ................... 370/216 |
| 6,237,029 B1 | * | 5/2001 | Master et al. ............... 709/217 |

* cited by examiner

DETECTION OF PRESENCE OF MULTIPROTOCOL ENCAPSULATION IN A DATA PACKET

BACKGROUND OF THE INVENTION

1. Field of the Invention

The present invention pertains to data communication network services using Frame Relay (FR) and/or Asynchronous Transfer Mode (ATM) data communication protocols. The present invention relates to FR/ATM service interworking used to couple virtual connections that are provisioned between FR and ATM networks.

2. Related Art

The Frame Relay Forum and ATM Forum developed a joint implementation agreement which specified a method to provide permanent virtual connection (PVC) interworking between Frame Relay networks and ATM networks. This Implementation Agreement was formalized by the Frame Relay Forum and is known as FRF.8. See, "Frame Relay/ATM PVC Service Interworking Implementation Agreement," The Frame Relay Forum, Document Number FRF.8, Apr. 14, 1995 (incorporated herein by reference).

The FRF.8 Agreement defines a protocol translation process known as a FR/ATM service interworking function or FR/ATM Service IWF. The service interworking function maps Frame Relay frames of data to ATM (ATM Adaptation Layer 5) AAL5 frames of data and vice versa. The service IWF can be implemented in a Frame Relay switch, ATM switch, and/or other separate processor devices.

FRF.8 specifies two modes of operation for each virtual connection regarding multiprotocol encapsulation, and in particular, upper layer user protocol encapsulation. The two modes of operation are called Translation Mode and Transparent Mode. Translation Mode is used to translate between different types of multiprotocol encapsulation on a virtual connection. Multiprotocol encapsulation is used to carry multiple protocols within a single virtual connection. Transparent Mode is used when a virtual connection is not transporting multiple protocols.

According to this industry standard, a FR or ATM virtual connection could support traffic in one of two mode types for multiprotocol encapsulation, either a Translation Mode or a Transparent Mode. The mode type had to be specified during the provisioning process used to establish FR and ATM virtual connections. The FR/ATM service interworking function was then preconfigured to either the Translation mode or the Transparent mode to match the mode type used by FR and ATM customer premise equipment for the virtual connections.

The customer premise equipment configuration, however, is likely to be modified as a result of application requirements, equipment change, software upgrade, repair or other type of servicing. Thus, customer premise equipment can require a different multiprotocol encapsulation mode type with or without making corresponding changes to preconfigured FR/ATM service interworking function connections. Indeed, FR/ATM service IWF modules are often under the control of a network service provider or other independent entity. CPE reconfiguration could result in failure of the Interworking Function to properly map a payload between the Frame Relay network and the ATM network. Failure to properly map the payload would result in the customer placing an order to change the multiprotocol encapsulation mode type. The mode type would then need to be re-provisioned for each impacted virtual connection, i.e., each impacted Frame Relay Permanent Virtual Connection (PVC) and ATM Virtual Channel Connection (VCC).

The conventional requirement that a multiprotocol encapsulation mode type be preset during the provisioning of virtual connections needs to be eliminated. What is needed is FR/ATM Service Interworking functionality which can transfer data over virtual connections between FR and ATM networks regardless of which multiprotocol encapsulation mode type (Translation Mode or Transparent Mode) is required by customer equipment.

SUMMARY OF THE INVENTION

The present invention is an enhancement to conventional FR/ATM service interworking that eliminates the need to specify interworking multiprotocol encapsulation mode type during preconfiguration of a FR/ATM virtual connection. The present invention provides a method, system and computer program product which automatically detects the presence of multiprotocol encapsulation. The FR/ATM service interworking function then operates in translation mode or transparent mode depending upon the presence or absence of multiprotocol encapsulation.

In a preferred embodiment, a multiprotocol encapsulation detection module first reads a control field value in a received protocol data unit (PDU). The control field value is then compared to a predetermined value representative of the presence of multiprotocol encapsulation in the PDU. An indication of the detected presence of multiprotocol encapsulation in the PDU is then provided when the control field value equals the predetermined value. An FR/ATM service interworking function module is then operated in Translation mode when multiprotocol encapsulation has been detected and indicated. Otherwise, the FR/ATM service interworking function module is operated in Transparent mode when multiprotocol encapsulation has not been detected.

According to another preferred embodiment of the present invention which is compatible with FR/ATM industry standards defined by the FRF.8 Agreement, a multiprotocol encapsulation detection module first reads a control field value in a Frame Relay or ATM AAL5 protocol data unit (PDU). The control field value is then compared to a predetermined value 0x03 representative of the presence of multiprotocol encapsulation for Layer 2 and Layer 3 protocols in FR and ATM AAL5 PDUs. An indication of the detected presence of multiprotocol encapsulation in the PDU is provided when the control field value equals the predetermined value 0x03, that is, "03" in hexadecimal or 00000011 in binary. A FR/ATM service interworking function module is then operated in Translation mode when multiprotocol encapsulation has been detected and indicated. Otherwise, the FR/ATM service interworking function module is operated in Transparent mode when multiprotocol encapsulation has not been detected.

For example, when multiprotocol encapsulation is used in the FR to ATM direction, the first octet after the Frame Relay header contains the Q.922 Control Field. The Q.922 Control Field is the first octet of the multiprotocol encapsulation header, as defined, in the RFC 1490, FRF.3, and FRF.3.1 standards. For a FR PDU, the multiprotocol encapsulation detection module compares the Q.922 Control field value to a predetermined value equivalent to 0x03, that is, "03" in hexadecimal or 00000011 in binary. When the Control field value is 0x03, the multiprotocol encapsulation detection module indicates that multiprotocol encapsulation has been detected. When multiprotocol encapsulation is detected, a FR/ATM Service IWF module operates in Translation Mode to translate the encapsulation type from Frame Relay RFC 1490, FRF.3 or FRF.3.1 multiprotocol encapsulation to ATM RFC 1483 multiprotocol encapsulation. Otherwise, when multiprotocol encapsulation is not detected, the FR/ATM Service IWF module operates in Transparent mode to de-encapsulate the FR PDU to a FR payload and then directly encapsulate the FR payload into an ATM AAL5 PDU.

In the ATM to FR direction where ATM AAL5 PDUs are received, when multiprotocol encapsulation is used the third octet of an ATM AAL5 multiprotocol encapsulation header, as defined in RFC 1483, is the IEEE 802.2 LLC Control Field. For an ATM AAL5 PDU, the multiprotocol encapsulation module compares the LLC Control field value to a predetermined value equivalent to 0x03, that is, "03" in hexadecimal or 00000011 in binary. When the Control field value is 0x03, the multiprotocol encapsulation detection module indicates that multiprotocol encapsulation has been detected. When multiprotocol encapsulation is detected, a FR/ATM Service IWF module operates in Translation Mode to translate the encapsulation type from ATM RFC 1483 multiprotocol encapsulation to Frame Relay RFC 1490, FRF.3 or FRF.3.1 multiprotocol encapsulation. Otherwise, when multiprotocol encapsulation is not detected, the FR/ATM Service IWF module operates in Transparent mode to de-encapsulate the ATM AAL5 PDU payload and directly encapsulate the payload into a FR PDU.

Automatic detection of multiprotocol encapsulation according to the present invention allows a service provider for the first time to avoid preconfiguring the mode type for every virtual connection established between Frame Relay and ATM networks. This feature significantly improves provisioning and management efficiency for connections provisioned between the Frame Relay and ATM networks.

The present invention provides an efficient process for provisioning and management of virtual connections between the Frame Relay and ATM networks. The present invention eliminates the requirement to re-provision the virtual connection if a customer modifies CPE equipment configuration. This capability significantly reduces operational troubleshooting procedures and expense. From the perspective of a customer and a data communication network service provider, automatic detection of multiprotocol encapsulation according to the present invention represents a significant enhancement in Frame Relay and ATM data services.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

Figure 1:
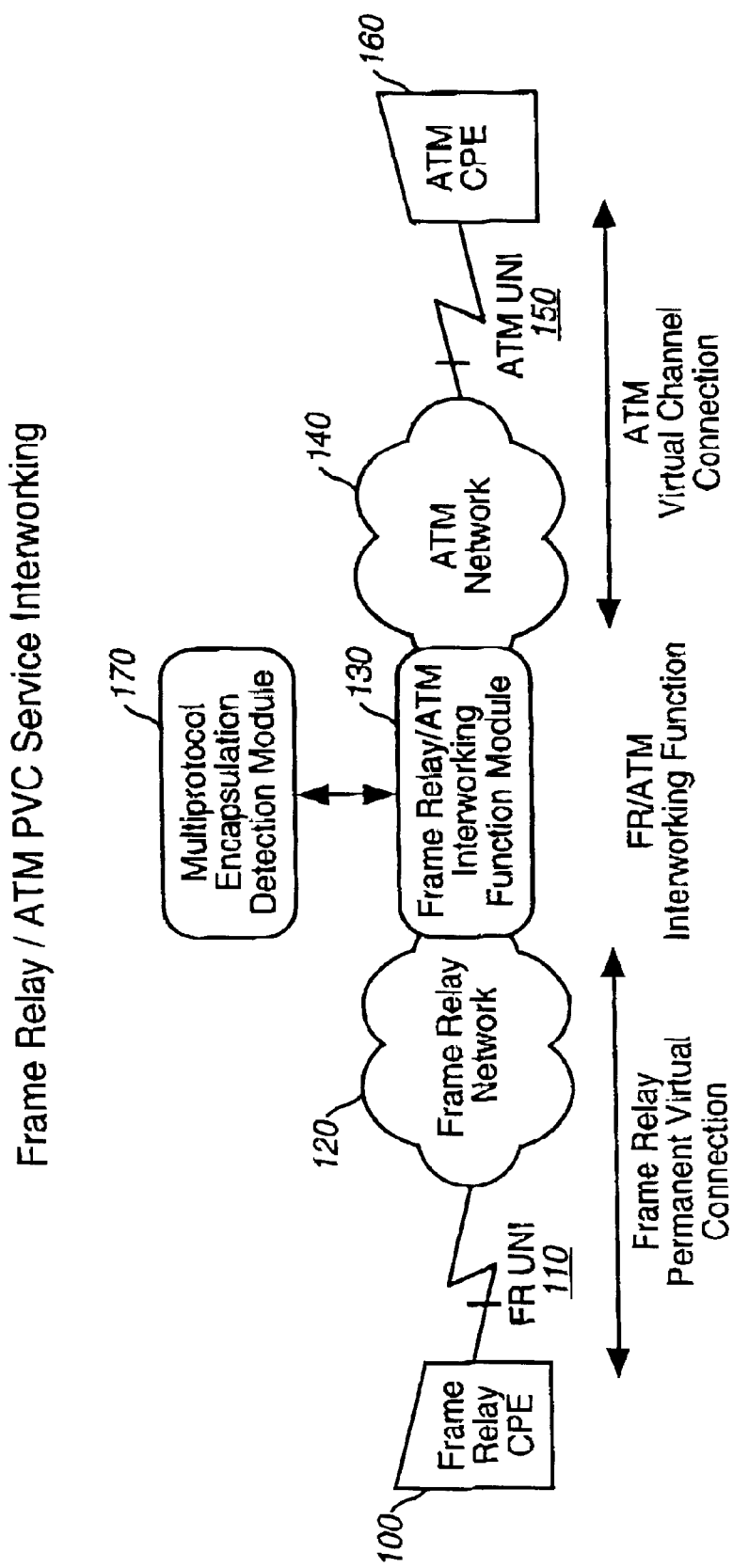
FIG. 1 is a block diagram illustrating service interworking between Frame Relay and ATM services including multiprotocol encapsulation detection according to the present invention.

The present invention will now be described with reference to the accompanying drawings. In the drawings, like reference numbers indicate identical or functionally similar elements. Additionally, the left-most digit(s) of a reference number typically identifies the drawing in which the reference number first appears.

DETAILED DESCRIPTION OF THE PREFERRED EMBODIMENTS

Table of Contents

I. Overview
II. Terminology
III. Example Environment
IV. FR/ATM Service Interworking with Detection of Multiprotocol Encapsulation
V. Detection of FR/ATM Multiprotocol Encapsulation
  A. Operation
VI. Example Computer Environment
VII. Conclusion
VIII. Acronym Appendix I. Overview The present invention is an enhancement to conventional FR/ATM service interworking. In particular, the present invention provides a system, method and/or computer program product which automatically detects FR/ATM multiprotocol encapsulation to determine whether a FR/ATM service interworking function should operate in translation or transparent mode. This provides the ability for FR Permanent Virtual Connections and ATM Virtual Channel Connections to operate in both Translation Mode and Transparent Mode. The interworking mode type for upper layer user protocol encapsulation can be set dynamically by network FR/ATM service interworking equipment and does not have to be fixed during provisioning of customer FR and ATM connections (e.g., FR-PVCs and ATM-VCCs).

II. Terminology

To more clearly delineate the present invention, an effort is made throughout the specification to adhere to the following term definitions as consistently as possible.

"Data" refers to voice, telephony, graphics, video, audio, computer data, and any other type of digital data.

"Virtual connection" refers to a logical data communication path for transporting data. Virtual connections are configured in both Frame Relay and ATM networks. In a Frame Relay network, a virtual connection is referred to as a Frame Relay Permanent Virtual Connection (FR PVC). In an ATM network, a virtual connection is referred to as an ATM Virtual Channel Connection (ATM VCC).

"Protocol data unit" (PDU), also called a data packet, cell, or frame, represents a data unit carried over a virtual connection. A Frame Relay PDU carries data in a Frame Relay payload. A FR PDU further includes a Frame Relay header (two or more octets in length) that is used to transport the FR PDU over a FR network. A multiprotocol encapsulation header is included in an FR PDU when multiprotocol encapsulation is used. The multiprotocol encapsulation header in a FR PDU includes a control field. For example, the first octet of the multiprotocol encapsulation header is defined to be a Q.922 control field according to RFC 1490, FRF.3 and FRF.3.1 industry standards. The Q.922 control field has a value 0x03 for all widely used Layer 2 and Layer 3 protocols.

An ATM Adaptation Layer (AAL) PDU carries data in an ATM AAL payload. For purposes of the present invention, ATM AAL PDU can include a PDU in any ATM Adaptation Layer or sub-layer including, but not limited to, the AAL5 convergence (Common Part and Service Specific) sublayers, and Segmentation and Reassembly (SAR) sublayer. A multiprotocol encapsulation header is included in an ATM AAL PDU when multiprotocol encapsulation is used. The multiprotocol encapsulation header in an ATM AAL PDU includes a control field. For example, for an ATM AAL5 PDU the third octet of the multiprotocol encapsulation header is defined to be an IEEE 802.2 LLC control field according to the RFC 1483 industry standard. The 802.2 LLC control field has a value 0x03 for all widely used Layer 2 and Layer 3 protocols.

"Multiprotocol encapsulation" refers to the encapsulation of one or more data communication protocols in one or more PDUs carried over a FR virtual connection and an ATM virtual connection. The encapsulated data communication protocol(s) can be any combination of data protocols supported by Frame Relay and ATM networks. These protocols can include, but are not limited to, upper user layer protocols, such as, Layer 2 and Layer 3 protocols, routed protocols with and without an NLPID assignment, bridged packets, and protocols using Q.933 NLPID. Multiple synchronous and/or asynchronous data protocols (public or proprietary) can be encapsulated including, but not limited to, TCP, IP, TCP/IP, ISO CLNP, IPX, AppleTalk, Decnet, Vines, ARP, 802.3–802.6 with FCS, 802.3–802.6 without FCS, FDDI with FCS, FDDI without FCS, 802.1 Bridged PDU, Source Route Bridge PDU, Fragmented PDU, SNA, Subarea FID4, Peripheral FID 2, APPN FID 2, NETBIOS FID 2, HPR, X.25, and any other type of data protocol supported by FR and ATM networks.

"Multiprotocol encapsulation mode type," also referred herein to as mode type, is used to indicate the presence and absence of multiprotocol encapsulation, that is, whether multiprotocol encapsulation has been used in forming a PDU for a virtual connection. Translation Mode is used to indicate the presence of multiprotocol encapsulation. Transparent Mode is used to indicate the absence of multiprotocol encapsulation.

The following industry standards are each incorporated by reference herein:

"FRF. 8," "FRF.8 Agreement," and equivalents, modifications, and updates thereto, refer to "Frame Relay/ATM PVC Service Interworking Implementation Agreement," Document FRF.8, Frame Relay Forum, Edited by D. O'Leary, Apr. 14, 1995.

"Frame Relay RFC 1490," "RFC 1490," and equivalents, modifications, and updates thereto, refer to "Multiprotocol Interconnect over Frame Relay," Internet Engineering Task Force Document IETF RFC 1490, Jul. 1993.

"FRF.3," "FRF.3 Agreement," and equivalents, modifications, and updates thereto, refer to "Multiprotocol Encapsulation Implementation Agreement," Document FRF.3, Frame Relay Forum, Jul. 1993.

"FRF.3.1," "FRF.3.1 Agreement," and equivalents, modifications, and updates thereto, refer to "Multiprotocol Encapsulation Implementation Agreement," Document FRF.3.1, Frame Relay Forum, Jun. 22, 1995.

"ATM RFC 1483," "RFC 1483," and equivalents, modifications, and updates thereto, refer to "Multiprotocol Encapsulation over AAL5," Internet Engineering Task Force Document IETF RFC 1483, Jul. 1993. The standards are referenced to describe specific preferred examples and/or implementations, and are not intended to limit the present invention.

III. Example Environment

The present invention is described in the example environment of a service interworking function between Frame Relay and ATM systems. Description in these terms is provided for convenience only. It is not intended that the invention be limited to application in this example environment. In fact, after reading the following description, it will become apparent to a person skilled in the relevant art how to implement the invention in alternative environments.

IV. FR/ATM Service Interworking with Detection of Multiprotocol Encapsulation FIG. 1 shows a block diagram illustrating service interworking between Frame Relay and ATM services. Blocks 100 to 160 represent conventional FR/ATM Servicing Interworking components in an FR/ATM internetwork, as described, for example in the FRF.8 Frame Relay-ATM Forum Agreement incorporated by reference above. Block 170 is an enhancement to FR/ATM service interworking, according to the present invention, that provides detection of multiprotocol encapsulation.

Frame Relay Customer Premise Equipment (CPE) 100 and ATM Customer Premise Equipment 160 are both coupled to a Frame Relay/ATM Service Interworking Function module 130. FR CPE 100 is connected through a Frame Relay User-Network Interface (FR-UNI) 110 to a Frame Relay Network 120. In this way, one or more Frame Relay Permanent Virtual Connections (FR PVCs) can be configured to carry data between the Frame Relay CPE 100 and Frame Relay/ATM Service Interworking module 130. Frame Relay CPE 100 can be any type of end-user computer terminal, server, or other type of processor or interface. Frame Relay network 120 can be any type of network design and size supporting FR data communication, e.g., a local-area network (LAN), intermediate-area network, or wide-area network (WAN). Frame Relay CPE 100 can also be connected through FR UNI 110 to the Frame Relay/ATM Service IWF module 130 directly, thereby, omitting the need for Frame Relay Network 120.

ATM CPE 160 is connected through an ATM User-Network Interface (ATM-UNI) 150 to an ATM Network 140. In this way, one or more ATM Virtual Channels Connections (ATM VCCs) can be configured to carry data between the ATM CPE 160 and Frame Relay/ATM Service Interworking module 130. ATM CPE 160 can be any type of end-user computer terminal, server, or other type of processor or interface. ATM network 140 can be any type of network design and size supporting ATM data communication, e.g., a local-area network (LAN), intermediate-area network, or wide-area network (WAN). ATM CPE 160 can also be connected through ATM UNI 150 to the Frame Relay/ATM Service IWF module 130 directly, thereby, omitting the need for ATM Network 140.

The FR/ATM Service IWF module 130, as shown in FIG. 1, is not intended to imply any particular physical location. The Service IWF 130 functionality can be provided by a single network device or within multiple network devices including network node(s) and/or network management components.

According to the present invention, a Multiprotocol Encapsulation Detection Module 170 is provided to automatically detect multiprotocol encapsulation. Module 170 communicates with the FR/ATM Service IWF module 130 to direct the FR/ATM Service IWF Module to operate in a Translation mode when multiprotocol encapsulation is detected or a Transparent Mode when multiprotocol encapsulation is not detected. In this way, the interworking mode type for multiprotocol encapsulation can be automatically set and does not have to be fixed during provisioning of FR and ATM connections (e.g., FR-PVCs and ATM-VCCs). The operation of module 170 is described in further detail below with respect to a FR/ATM Service Interworking Function with Multiprotocol Encapsulation Detection Routine 400 shown in FIG. 4 and an example computer processor and program product embodiment shown in FIG. 5. Because automatic multiprotocol encapsulation detection controls the mapping of FR PDUs and ATM AAL5 PDUs during FR/ATM service interworking in either a Translation Mode or a Transparent mode, it is helpful to review elements of FR and ATM AAL5 protocol stacks and PDUs.

Figure 2:
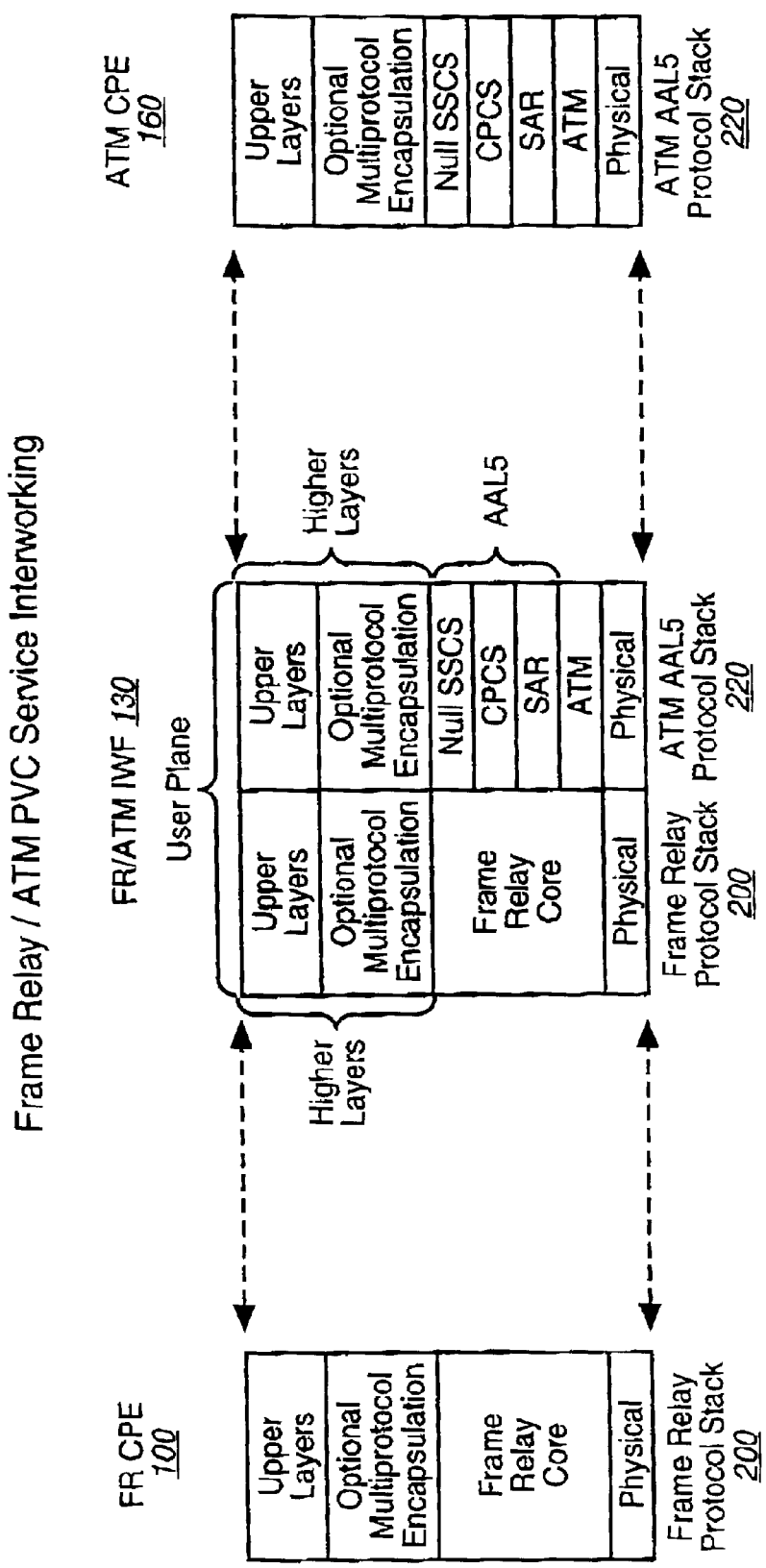
FIG. 2 is a block diagram of standard protocol stacks used in FR/ATM service interworking.

FIG. 2 shows a protocol stack model representing a standard conversion of data between FR protocol data units (FR PDUs), also called FR packets or frames, and ATM Adaptation Layer protocol data units (ATM AAL PDUs) (also called ATM AAL cells, frames, or packets) in FR/ATM service interworking. As would be apparent to one skilled in the art, the protocol stack model shown in FIG. 2 represents a standard multiple-layer depiction of the functionality provided in a FR/ATM internetwork communication and need not be described in detail. See, e.g., FRF.8 Frame Relay Forum Agreement (incorporated by reference above) and the reference textbook by David E. McDysan et al, ATM: *Theory and Application,* (McGraw-Hill, Inc.: U.S.A.), 1995 (incorporated by reference in its entirety herein).

Briefly, Frame Relay Protocol stack 200 depicts four layers (or services) commonly found in a Frame Relay network architecture: Physical layer, Frame Relay frame layer (also called a link or a data-link layer), and multiple Higher layers including an Optional Multiprotocol Encapsulation layer and Upper layer(s).

ATM AAL5 Protocol stack 220 depicts four layers commonly found in an ATM network architecture: Physical layer, ATM layer (also called a link or data-link layer), ATM Adaptation Layer (AAL5), and two Higher layers. In general, the AAL5 layer further includes: a Segmentation and Reassembly (SAR) layer, a Common Part Convergence Sublayer (CPCS), and a null Service Specific Convergence Sublayer (null SSCS). The two higher layers include an Optional Multiprotocol Encapsulation layer and Upper layers for performing upper level functions in user, control, and management planes. The above description is provided with respect to an AAL5 definition which is now used predominantly in the communications industry for variable bit rate traffic both connectionless and connection-oriented service. Other ATM Adaptation layer definitions may be used in the present invention.

Figure 3:
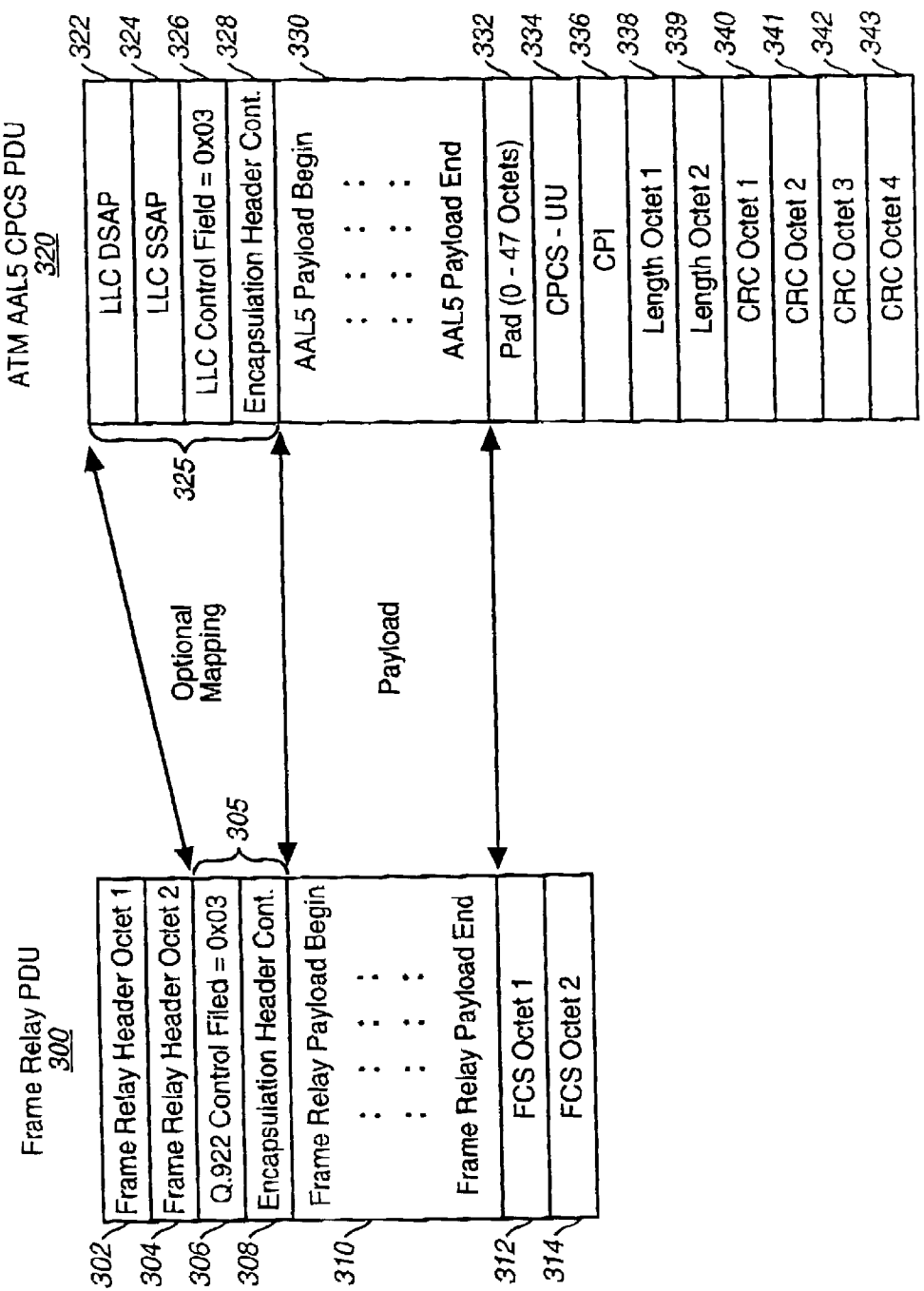
FIG. 3 shows standard formats for a Frame Relay PDU and a ATM AAL5 CPCS PDU used in FR/ATM service interworking.

The FR/ATM Service IWF module 130 is generally implemented at a node, host, or other network device. Among its many functions, FR/ATM Service Interworking Function Module 130 operates to convert FR PDUs to ATM AAL5 PDUs and vice versa. FIG. 3 depicts an example Frame Relay PDU 300 and an example ATM AAL5 CPCS PDU 320 when multiprotocol encapsulation has been performed. FR PDU 300 includes a Frame Relay payload 310 that contains actual user data being transported to or from FR CPE 100. The FR payload typically varies in length between 1 to 8192 octets. Each octet represents one byte, that is, 8 bits. Data, voice, telephony, audio, video, graphics, and any other type of digital data can be used.

Two Frame Relay headers 302,304 occupy the first two octets of FR PDU 300. The Frame Relay headers 302, 304 contain information that governs the transport of the FR PDU 300 over a frame relay network. A variable length encapsulation header 305 is provided between FR header 304 and FR payload 310. When multiprotocol encapsulation has been performed, i.e., by a FR CPE 100, the FR PDU 300 encapsulation header 305 has a Q.992 Control Field 306. The Control field further has a predefined value. For example, the Q.992 Control field value is "03" in hexadecimal which corresponds to a "00000011" binary value.

Other encapsulation header information is included in a variable length field 308. The encapsulation header information and its length are a function of specific applications and data protocols being used by the customer equipment. In general, one or more synchronous and/or asynchronous data or voice communication data protocols (public or proprietary) can be further encapsulated including TCP, IP, TCP/IP, IPX, X.25, SNA, etc.

Two frame check sequence FCS octets 312, 314 are provided at the end of the FR PDU 300. Flags and delimiters can also be included at the start and end of FR PDU 300; however, these are generally stripped by FR/ATM Service Interworking module 130 in converting FR packet data in the FR to ATM direction.

ATM AAL5 CPCS PDU 320 includes an AAL5 payload 330, also called a CPCS payload, that contains actual user data being transported to or from ATM CPE 160. The AAL5 payload typically varies in length between 1 to 65,535 octets. Each octet represents one byte, that is, 8 bits. Voice, telephony, audio, video, graphics, and any other type of digital data can be used. Pad 330 has a variable length between 0 and 47 octets chosen such that the entire ATM AAL5 CPCS PDU 320 has a length which is a multiple of 48 octets so that the PDU 320 can be directly segmented into ATM cell payloads. Other standard ATM AAL5 CPCS PDU fields are included, such as, CPCS-UU field 334 (one octet), CPI field 336 (one octet), Length fields 338, 339 (two octets), and cyclic redundancy check CRC field 340–343 (four octets).

A variable length encapsulation header 325 precedes AAL5 payload 330 when multiprotocol encapsulation is provided. The variable length encapsulation header 325 includes four fields 322, 324, 326 and 328. In this example, two RFC 1483 octets, LLC DSAP 322 and LLC SSAP 324, occupy the first two octets of ATM AAL5 CPCS PDU 320 and contain Destination and Source Service Access Point information respectively.

When multiprotocol encapsulation has been performed by an ATM CPE 160, the ATM AAL5 CPCS PDU encapsulation header 325 has an LLC Control Field 326. The Control field 326 further has a value predefined according to industry standards. For example, the LLC Control field value is "03" in hexadecimal which corresponds to a "00000011" binary value in the third octet of ATM AAL5 CPCS PDU 320.

Other encapsulation header information is included in a variable length field 328. This encapsulation header information and its length depend upon the specific applications and data protocols being used by the customer equipment. In general, one or more synchronous and/or asynchronous data communication data protocols (public or proprietary) can be further encapsulated including TCP, IP, TCP/IP, IPX, X.25, SNA, etc. Further headers, trailers, and/or cells (not shown) can also be included at the start and end of ATM PDU 320; however, these are generally stripped by FR/ATM Service Interworking module 130 in converting ATM packet data in the ATM to FR direction or FR to ATM direction.

V. Detection of FR/A TM Multiprotocol Encapsulation

A. Operation

Figure 4:
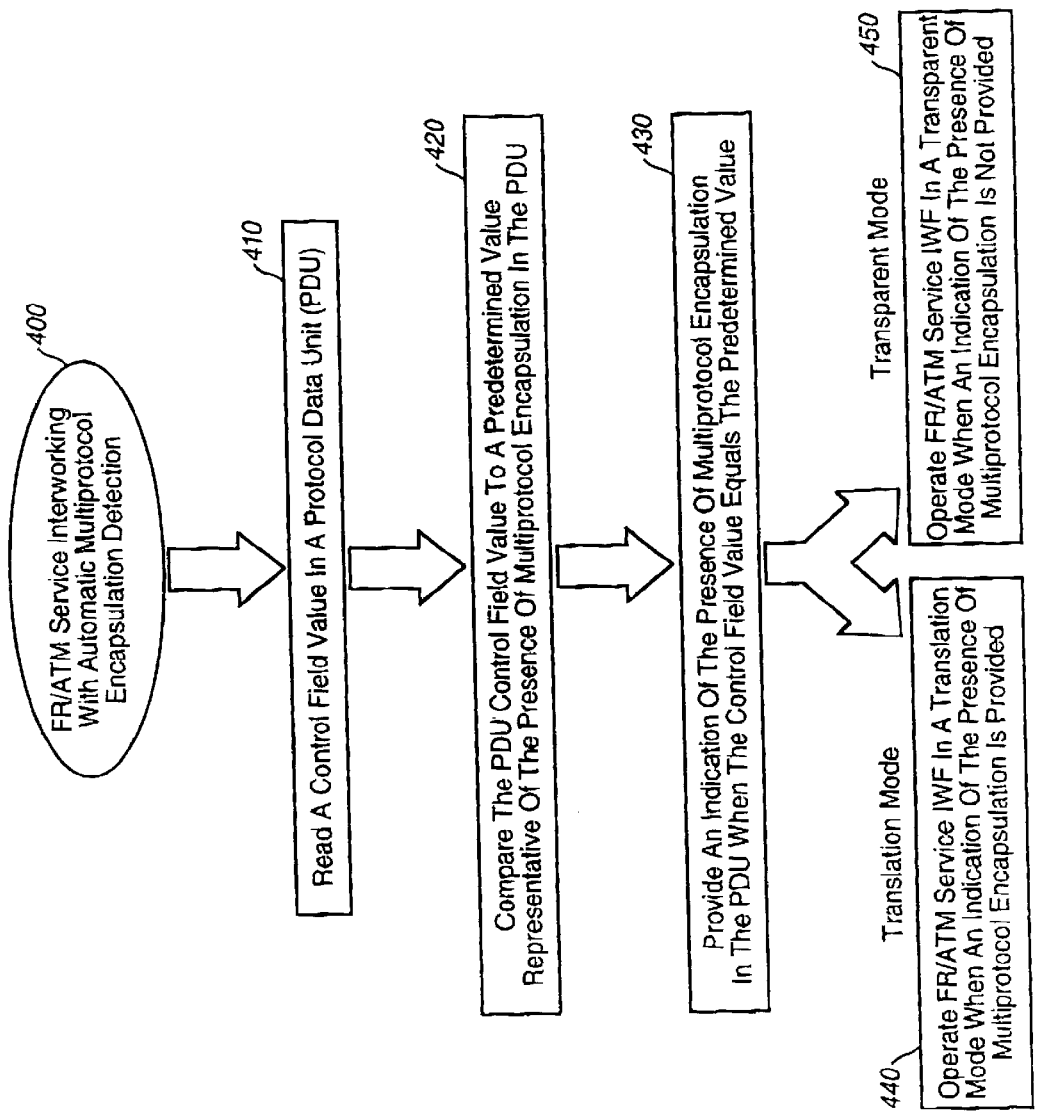
FIG. 4 shows a flowchart for automatic detection of multiprotocol encapsulation in FR/ATM service interworking according to the present invention.

FIG. 4 shows the operation of FR/ATM service interworking with automatic multiprotocol encapsulation detection according to the present invention in a routine 400. First, module 170 reads a control field value in a protocol data unit (PDU) (step 410). The PDU is received over a FR or ATM connection and can be either a FR PDU or an ATM AAL PDU as described above with respect to FIGS. 1–3.

Next, module 170 compares the Control Field value in the received PDU to a predetermined value representative of the presence of multiprotocol encapsulation (step 420). According to a preferred embodiment of the present invention compatible with the FRF.8 Agreement, in step 420 the Control Field carried within the Frame Relay PDU or ATM Adaptation Layer (e.g., AAL5) PDU is examined to determine whether the payload is utilizing multiprotocol encapsulation.

For example, as described above with respect to FIG. 3, in the FR to ATM direction the first octet of the Frame Relay multiprotocol encapsulation header, as defined, in RFC 1490, FRF.3, and FRF.3.1 is the Q.992 Control Field 306. The Control Field value is 0x03 for all widely used Layer 2 and Layer 3 protocols. "0x03" is a notation used in telecommunications to represent "03" in hexadecimal (or 00000011 in binary). In step 420, then, for a FR PDU 300, module 170 will compare the Control Field value 306 to a predetermined value equivalent to 0x03, that is, "03" in hexadecimal or 00000011 in binary. If the value in Control Field 326 is 0x03, then the Encapsulation Detection module 170 will indicate that multiprotocol encapsulation has been detected (step 430).

In the ATM to FR direction where ATM AAL5 PDUs are received, the third octet of an ATM AAL5 PDU, as defined in RFC 1483, is the IEEE 802.2 LLC Control Field 326. The Control Field 326 has a value of 0x03 for all encapsulated Layer 2 and Layer 3 protocols. In step 420, then module 170 will examine the Control Field 326 for an ATM AAL5 PDU 320. If the Control Field 306 is 0x03, then the Encapsulation Detection module 170 will indicate that multiprotocol encapsulation has been detected (step 430).

Flags, interrupts, direct messages, or direct control or status signals can be set or sent from the module 170 to FR/ATM Service IWF module 130 to indicate that multiprotocol encapsulation has been detected. These types of indicators are examples. Other forms of indicating a detected condition to a FR/ATM service working module 130 would be apparent to one skilled in the art.

In step 440, when multiprotocol encapsulation has been detected and indicated in step 430, then the FR/ATM service interworking function module 130 will operate in Translation mode. When multiprotocol encapsulation has not been detected, then the FR/ATM service interworking function module 130 will operate in Transparent mode (step 450).

For example, in the FR to ATM direction when multiprotocol encapsulation is detected, the FR/ATM Service IWF module 130 operates in Translation Mode to translate the encapsulation type from Frame Relay RFC 1490, FRF.3 or FRF.3.1 multiprotocol encapsulation to ATM RFC 1483 multiprotocol encapsulation. If multiprotocol encapsulation is not detected, then the FR/ATM service interworking function module 130 will operate in Transparent mode to de-encapsulate an FR PDU and directly encapsulate an FR payload into an ATM AAL5 PDU. In the ATM to FR direction, when multiprotocol encapsulation is detected, the FR/ATM Service IWF module 130 operates in Translation Mode to translate the encapsulation type from ATM RFC 1483 multiprotocol encapsulation to Frame Relay RFC 1490, FRF.3 or FRF.3.1 multiprotocol encapsulation. If multiprotocol encapsulation is not detected, then the FR/ATM service interworking function module 130 will operate in Transparent mode to de-encapsulate the ATM AAL5 PDU payload and directly encapsulate the payload into a FR PDU.

The conventional mapping operations of an FR/ATM Service IWF module 130 in both Translation and Transparent modes are well-known and need not be described in further detail. See, e.g., the FRF.8 Agreement incorporated by reference above. Routine 400 can be invoked dynamically for each PDU, for a selected sampling of PDUs, or for each virtual connection. Multiprotocol encapsulation can be detected for each PDU of a virtual connection or for a selected sampling of PDUs. Alternatively, multiprotocol encapsulation detection can be detected on a per virtual connection basis, that is, one PDU can be read for each virtual connection. Any sampling rate or interval can be used such as, every tenth PDU or every day, depending upon traffic conditions and frequency of configuration or equipment changes.

Preferably, steps 410 to 430 are implemented as a software routine executing in a computer represented schematically in FIG. 1 as module 170. Steps 440 to 450 are preferably implemented in a software routine executing in a computer represented schematically in FIG. 1 as FR/ATM Service IWF module 130. As would be apparent to one skilled in the art given this description, other alternative embodiments can implement any of steps 410 to 450 in any combination of software, hardware, and/or firmware on one or more processors.

VI. Example Computer Environment

Figure 5:
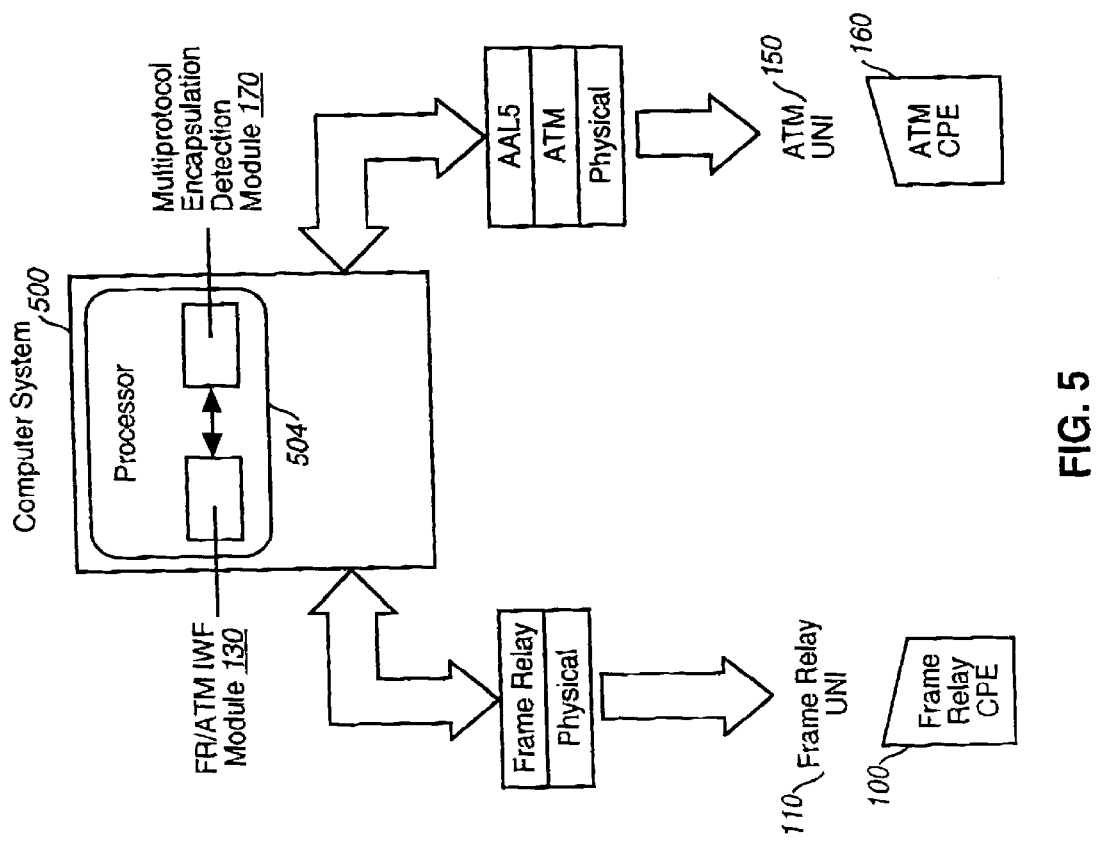
FIG. 5 is a logical diagram of an upper-layer FR/ATM service interworking function including multiprotocol encapsulation detection according to the present invention.
Figure 6:
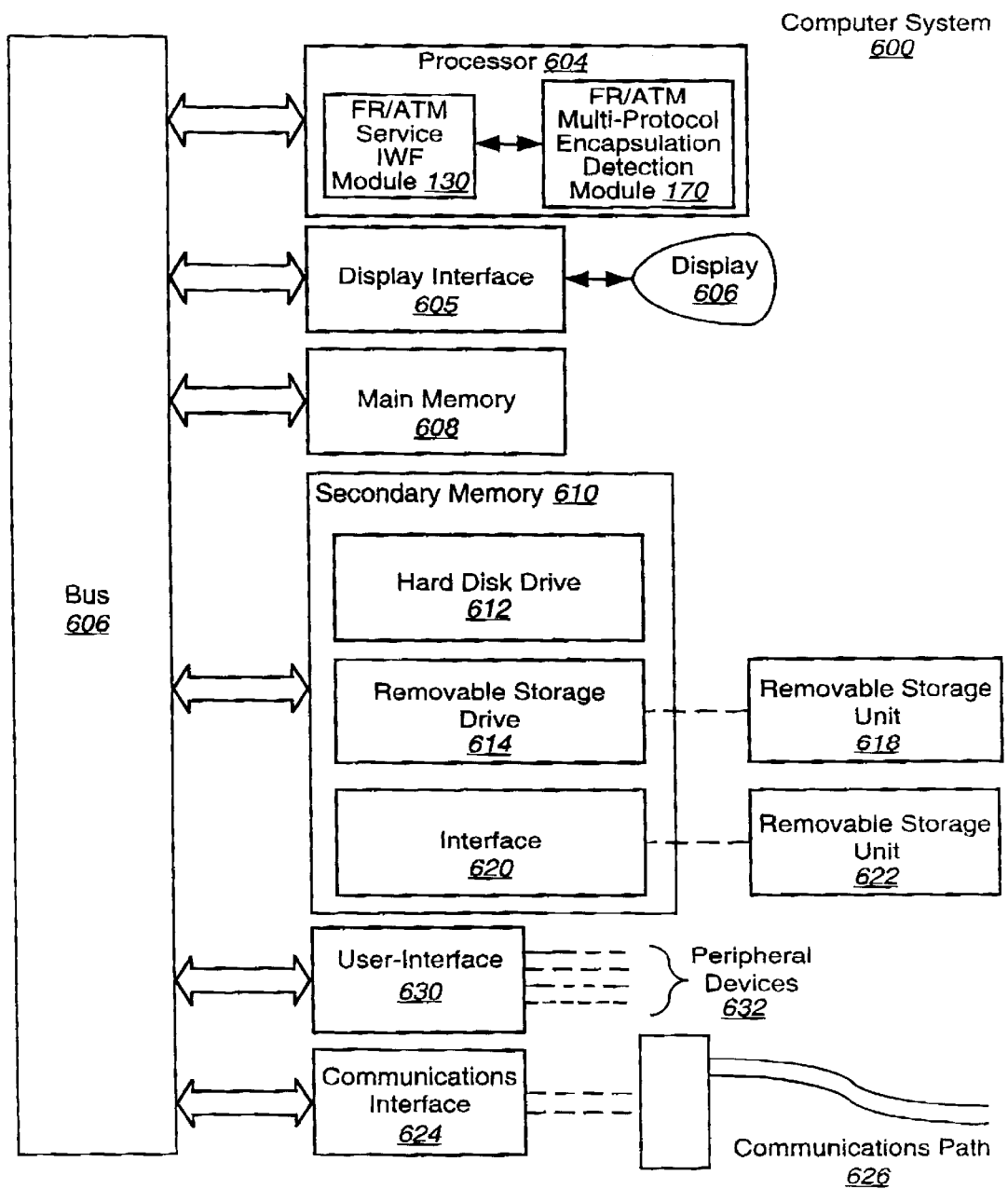
FIG. 6 is a block diagram of an example computer system implementing FR/ATM service interworking function and multiprotocol encapsulation detection according to the present invention.

FIGS. 5 and 6 illustrate an example computer embodiment implementing multiprotocol encapsulation detection according to the present invention as described above. As shown in a logical representation in FIG. 5, FR/ATM service interworking module 130 and multiprotocol encapsulation detection module 170 are preferably implemented in upper-layer software application(s) running on a processor 504 in a computer system 500. Upper-layer FR/ATM service interworking serves to map FR PDUs and ATM AAL5 PDUs passing to and from lower-layer Frame Relay layers and ATM Adaptation layers as shown in FIG. 5. The invention, however, is not limited to software only. As would be apparent to one skilled in the art, Multiprotocol Encapsulation Detection module 170 can be implemented in software, hardware, and/or firmware, and combination thereof.

FIG. 6 is a block diagram illustrating in more detail an example computer system 600 in which the present invention can operate. Computer system 600 includes one or more processors, such as processor 604. The processor 604 is connected to a communications bus 606.

Computer system 600 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618 represents a floppy disk, magnetic tape, optical disk, etc., which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means can include, for example, a removable storage unit 622 and an interface 620. Examples can include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 can also include a communications interface 624. Communications interface 624 allows software and data to be transferred between computer system 600 and external devices via communications path 626. Examples of communications interface 624 can include a modem, a network interface (such as Ethernet card), a communications port, etc. Software and data transferred via communications interface 624 are in the form of signals which can be electronic, electromagnetic, optical or other signals capable of being received by communications interface 624, via communications path 626. Note that communications interface 624 provides a means by which computer system 600 can interface to a network, such as, the Internet.

An optional graphical user interface module 630 transfers user inputs from peripheral devices 632 to bus 606. These peripheral devices 632 can be a mouse, keyboard, touch screen, microphone, joystick, stylus, light pen, or any other type of peripheral unit.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is preferably implemented using software running (that is, executing) in an environment similar to that described above with respect to FIG. 6. In this document, the term "computer program product" is used to generally refer to removable storage device 618 or a hard disk installed in hard disk drive 612. These computer program products are means for providing software to computer system 600.

Computer programs (also called computer control logic) are stored in main memory and/or secondary memory 610. Computer programs can also be received via communications interface 624. Such computer programs, when executed, enable the computer system 600 to perform the features of the present invention as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. Alternatively, the computer program product may be downloaded to computer system 600 over communications path 626. The control logic (software), when executed by the processor 604, causes the processor 604 to perform the functions of the invention as described herein.

Various software embodiments are described in terms of this example computer system. After reading this description, it will be apparent to a person skilled in the relevant art how to implement the invention using other computer systems and/or computer architectures.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

VII. Conclusion

Automatic detection of multiprotocol encapsulation according to the present invention allows a service provider for the first time to avoid preconfiguring the mode of operation for every virtual connection established between Frame Relay and ATM networks. This feature significantly improves provisioning and management efficiency for connections provisioned between the Frame Relay and ATM networks.

The present invention provides an efficient process for provisioning and management of virtual connections between the Frame Relay and ATM networks. The present invention eliminates the requirement to re-provision the virtual connection if the customer modifies the CPE equipment configuration. This capability significantly reduces operational troubleshooting procedures and expense. From the perspective of a customer and a data communication service provider, automatic detection of multiprotocol encapsulation according to the present invention represents a significant enhancement in Frame Relay and ATM data services.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

VIII. Acronym Appendix

| | |
|---|---|
| AAL | ATM Adaptation Layer |
| ATM | Asynchronous Transfer Mode |
| B-ISDN | Broadband Integrated Services Digital Network |
| CPE | Customer Premise Equipment |

-continued

| | |
|---|---|
| CPCS | Common Part Convergence Sub-Layer |
| DLCI | Data Link Connection Identifier |
| DTE | Data Terminal Equipment |
| FR | Frame Relay |
| IWF | Interworking Function |
| LAN | Local Area Network |
| NLPID | Network Level Protocol Identifier |
| PDU | Protocol Data Unit |
| PVC | Permanent Virtual Connection |
| SAR | Segmentation and Reassembly |
| SNA | System Network Architecture |
| SSCS | Service Specific Convergence Sub-Layer |
| TCP/IP | Transmission Control Protocol/Internet Protocol Suite |
| UNI | User to Network Interface |
| VCC | Virtual Channel Connection |
| VCI | Virtual Channel Identifier |
| VPC | Virtual Path Connection |
| VPI | Virtual Path Identifier |
| WAN | Wide-Area Network |

What is claimed is:

1. A method of operating an interworking function in the presence of multiprotocol encapsulation in a protocol data unit (PDU), said method comprising:

reading a control field value in a protocol layer of the PDU below a network layer;

detecting multiprotocol encapsulation in the PDU by comparing said control field value to a predetermined value representative of a presence of multiprotocol encapsulation in the PDU;

operating a link layer Interworking Function in Translation mode to translate an encapsulation type of a payload of the PDU in response to detecting multiprotocol encapsulation in the PDU; and operating the link layer Interworking Function in Transparent mode by de-encapsulating the payload from a first link layer protocol and re-encapsulating the payload in a second link layer protocol in response to a failure to detect multiprotocol encapsulation in the PDU.

2. The method of claim 1, wherein the PDU comprises at least one of a Frame Relay PDU and an ATM AAL (ATM Adaptation Layer) PDU.

3. The method of claim 2, wherein said predetermined value is equivalent to a hexadecimal number 03.

4. The method of claim 1, wherein operating a link layer Interworking Function comprises operating an FR/ATM (Frame Relay/Asynchronous Transfer Mode) Service Interworking Function.

5. The method of claim 1, wherein the PDU is one of an ATM and FR PDU, and wherein detecting multiprotocol encapsulation comprises detecting encapsulation of a protocol other than ATM and FR in the PDU.

6. The method of claim 1, and further comprising:

in response said detecting step and after provisioning of a virtual connection in which said PDU is communicated to said link layer Interworking Function, dynamically switching said link layer Interworking Function between said Translation mode and said Transparent mode.

7. A multiprotocol encapsulation detection system for detecting multiprotocol encapsulation in a protocol data unit (PDU), said system comprising:

means for reading a control field value in a protocol layer of the PDU below a network layer;

means for detecting multiprotocol encapsulation in the PDU by comparing said control said control field value to a predetermined value representative of a presence of multiprotocol encapsulation in the PDU; and mode control means for causing a link layer Interworking Function to operate in either a Translation mode or a Transparent mode, wherein said mode control means causes said link layer Interworking Function to operate in Translation mode to translate an encapsulation type of a payload of the PDU in response to detecting multiprotocol encapsulation in the PDU and causes the link layer Interworking Function to operate in Transparent mode to de-encapsulate the payload from a first link layer protocol and re-encapsulate the payload in a second link layer protocol in response to a failure to detect multiprotocol encapsulation in the PDU.

8. The system of claim 7, further comprising the link layer Interworking Function.

9. The system of claim 8, wherein said link layer Interworking Function comprises an FR/ATM (Frame Relay/Asynchronous Transfer Mode) Service Interworking Function.

10. The system of claim 7, wherein the PDU comprises at least one of a Frame Relay PDU and an TM AAL (ATM Adapter Layer) PDU.

11. The system of claim 7, wherein the PDU is one of an ATM and FR PDU, and wherein said means for detecting multiprotocol encapsulation comprises means for detecting encapsulation of a protocol other than ATM and FR in the PDU.

12. The system of claim 7, wherein said mode control means, responsive to said means for detecting, dynamically switches said link layer Interworking Function between said Translation mode and said Transparent mode after provisioning of a virtual connection in which said PDU is communicated to said link layer Interworking Function.

13. A computer program product comprising a computer useable medium having computer program logic recorded thereon for enabling a processor in a computer system to detect the presence of multiprotocol encapsulation in a protocol data unit (PDU), said computer program logic comprising:

means for enabling the processor to read a control field value in a protocol layer of the PDU below a network layer;

means for enabling the processor to detect multiprotocol encapsulation in the PDU by comparing said control field value to a predetermined value representative of the presence of multiprotocol encapsulation in the PDU; and mode control means for enabling the processor to set an operating mode of a link layer Interworking Function to either Translation mode or Transparent mode, wherein said mode control means causes the processor to set the operating mode of the link layer Interworking Function to Translation mode to translate an encapsulation type of a payload of the PDU in response to detecting multiprotocol encapsulation in the PDU and causes the processor to set the link layer Interworking Function to Transparent mode to de-encapsulate the payload from a first link layer protocol and re-encapsulate the payload in a second link layer protocol in response to a failure to detect multiprotocol encapsulation in the PDU.

14. The computer program product of claim 13, wherein the PDU is one of an ATM and FR PDU, and wherein said means for enabling the processor to detect multiprotocol encapsulation comprises means for the processor to detect encapsulation of a protocol other than ATM and FR in the PDU.

15. The computer program product of claim 13, wherein said mode control means, responsive to said means for enabling the processor to detect multiprotocol encapsulation, dynamically switches said link layer Interworking Function between said Translation mode and said Transparent mode after provisioning of a virtual connection in which said PDU is communicated to said link layer Interworking Function.

16. A system for detecting the presence of multiprotocol encapsulation in protocol data units transmitted across end-to-end interconnected Frame Relay (FR) equipment and Asynchronous Transfer Mode (ATM) equipment, comprising:

a FR/ATM service interworking function module coupled between the FR equipment and the ATM equipment, a FR permanent virtual connection configured to carry a FR protocol data unit between the frame relay equipment and said FR/ATM service interworking function module;

an ATM virtual channel connection configured to carry an ATM protocol data unit between the ATM equipment and said FR/ATM service interworking function module; and a multiprotocol encapsulation detection module for detecting a presence of multiprotocol encapsulation in at least one of said FR protocol data unit and said ATM protocol data unit and for providing an indication to said FR/ATM service interworking function module representative of the presence or absence of detected multiprotocol encapsulation, wherein said FR/ATM service interworking function module operates in a translation mode when multiprotocol encapsulation is detected and operates in a transparent mode when multiprotocol encapsulation is not detected.

17. The system of claim 16, further comprising:

a Frame Relay network coupled between said FR equipment and said FR/ATM service interworking function module; and an ATM network coupled between said ATM equipment and said FR/ATM service interworking function module.

18. The system of claim 16, wherein said multiprotocol encapsulation detection module comprises:

means for reading a control field in at least one of said FR PDU and said ATM PDU; and means for comparing said control field value to a predetermined value representative of the presence or absence of multiprotocol encapsulation in said at least one FR PDU and ATM PDU being read by said reading means;

wherein said indication is provided to said FR/ATM service interworking function module representative of the presence of detected multiprotocol encapsulation when said control field value equals said predetermined value.

19. The system of claim 16, wherein said multiprotocol encapsulation detection module detects the presence of multiprotocol encapsulation for each FR protocol data unit and for each ATM protocol data unit carried respectively by said FR permanent virtual connection and said ATM virtual channel connection.

20. The system of claim 16, wherein said multiprotocol encapsulation detection module detects the presence of multiprotocol encapsulation for a selected sampling of FR protocol data units and for a selected sampling of ATM protocol data units carried respectively by said FR permanent virtual connection and said ATM virtual channel connection.

21. The system of claim 16, wherein said multiprotocol encapsulation detection module detects the presence of multiprotocol encapsulation for said FR permanent virtual connection based on multiprotocol encapsulation detected in one FR PDU and detects the presence of multiprotocol encapsulation for said ATM virtual channel connection based on multiprotocol encapsulation detected in one ATM PDU.

22. The system of claim 16, wherein said multiprotocol encapsulation detection unit detects multiprotocol encapsulation if a protocol other than ATM and FR is encapsulated in the PDU.

23. The system of claim 16, wherein said FR/ATM service interworking function module, responsive to a change in said indication provided by said multiprotocol encapsulation detection module, dynamically switches said FR/ATM service interworking function module between said translation mode and said transparent mode after provisioning of a virtual connection in which said PDU is communicated to said FR/ATM service interworking function.

* * * * *